June 21, 1960  L. O. HEWKO  2,941,539
GOVERNOR
Filed June 10, 1958  2 Sheets-Sheet 1
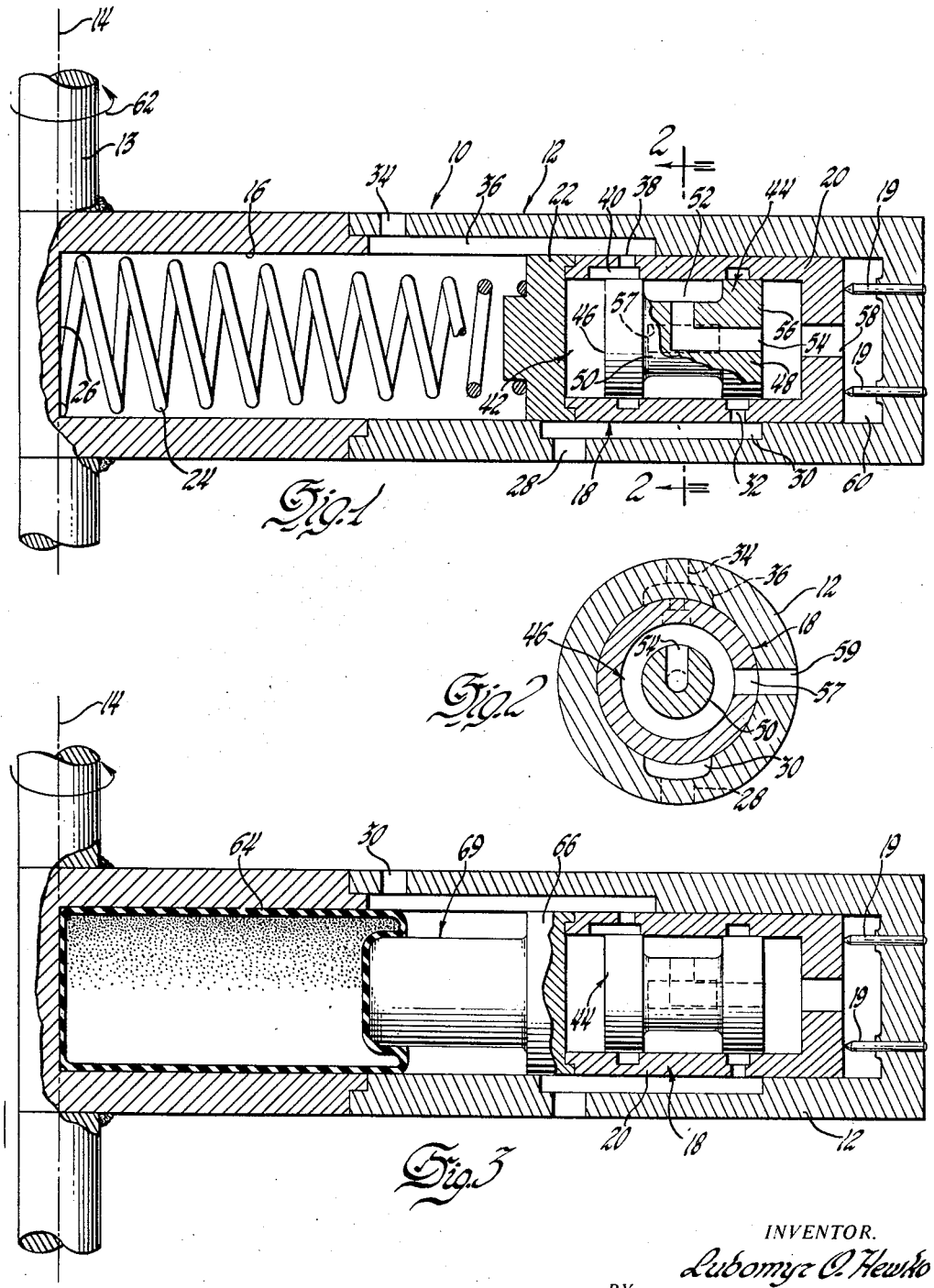
INVENTOR.
Lubomyr O. Hewko
BY
W. C. Middleton
ATTORNEY June 21, 1960 L. O. HEWKO 2,941,539
GOVERNOR Filed June 10, 1958 2 Sheets-Sheet 2

INVENTOR.
Lubomyr O. Hewko
BY
W. C. Middleton
ATTORNEY

United States Patent Office 2,941,539
Patented June 21, 1960

2,941,539

GOVERNOR

Lubomyr O. Hewko, Detroit, Mich., assignor to General Motors Corporation, Detroit, Mich., a corporation of Delaware Filed June 10, 1958, Ser. No. 741,121

12 Claims. (Cl. 137—56)

This invention relates to a hydraulic centrifugal governor.

More specifically, this invention relates to a hydraulic centrifugal governor developing an output pressure that varies as a linear function of the change in speed of rotation of the governor. Centrifugal pressure governors are in common use in, for example, transmissions where a varying hydraulic pressure may be desired for controlling a fluid operated mechanism in response to either engine or vehicle speed changes. Since the centrifugal force acting on a constant mass rotating about an axis varies directly with the square of the speed of rotation, a fluid pressure necessary to balance this centrifugal force would likewise vary in pressure according to the square of the speed producing a parabolic curve on a chart of pressure versus speed. This characteristic of centrifugal governors often imposes design problems especially if the governor is to be used in conjunction with hydraulic valves which essentially are linear moving devices. At low speeds of rotation of governors of this parabolic curve type, the governor is little sensitive to speed, while at high speeds, it is extremely sensitive to speed resulting in the pressure initially having a slow build-up with a fast final pressure. As a result, designers often use two separate governors for different speed ranges so as to more nearly approximate a linear output of the governor.

This invention eliminates the difficulties discussed above by providing a governor developing an output pressure that varies as a linear function of the change in speed of rotation of the governor, i.e., an output pressure having graphically a straight line relationship with speed.

Therefore it is an object of this invention to provide a hydraulic centrifugal governor construction that will automatically develop a pressure having a linear relationship to the change in speed of rotation of the governor.

Other features, advantages and objects will become apparent by reference to the succeeding detailed description and to the drawings wherein the preferred embodiments of the invention are illustrated.

Figure 4:
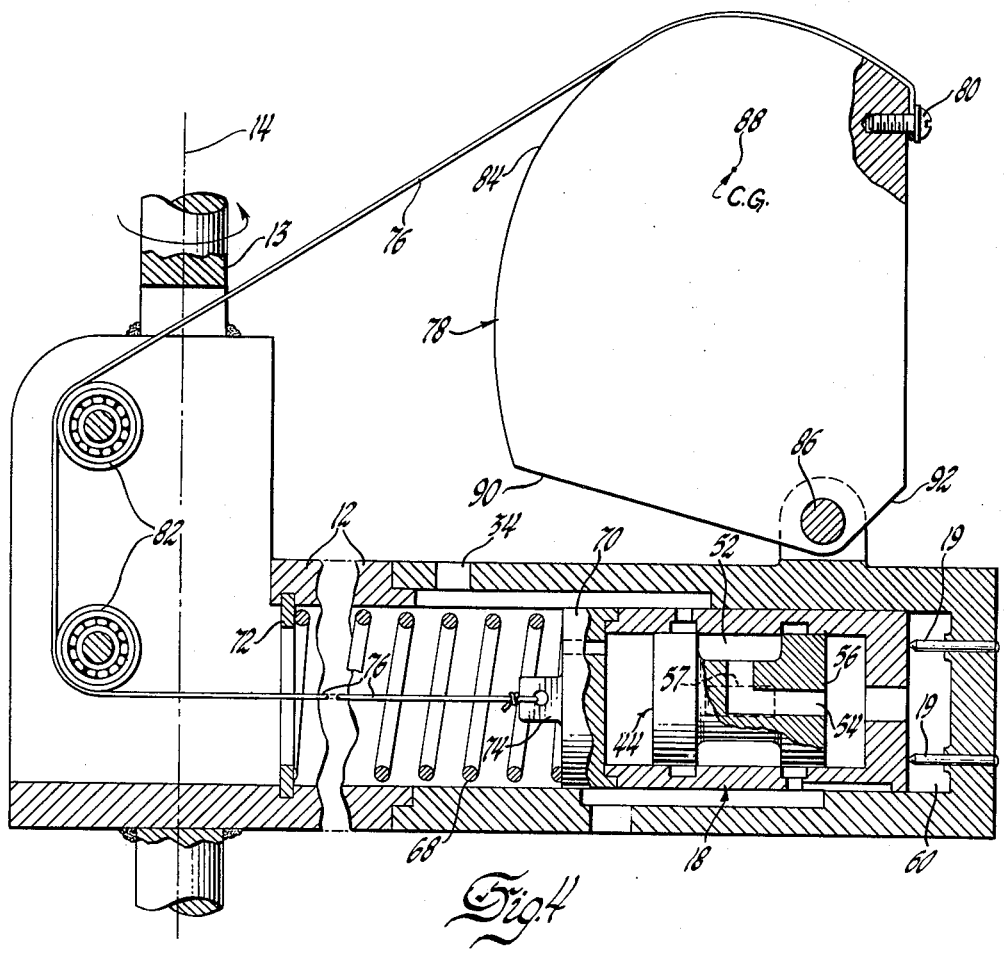
Figure 5:
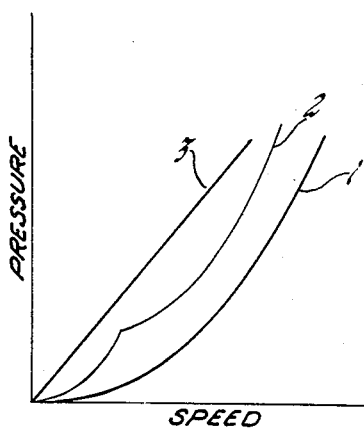

Figure 1 is a cross-sectional view of one of the preferred embodiments of this invention, Figure 2 is a cross-sectional view obtained by passing a plane through the Figure 1 construction as indicated by the line 2—2 of Figure 1, Figures 3 and 4 are modifications of the governor of Figure 1, and Figure 5 is a chart or graph depicting the relative relationships of the output pressures for different governors.

As mentioned previously, the conventional centrifugal hydraulic governors develop an output pressure varying with the square of the speed of rotation of the governor to produce in graphical representation a parabolic curve as illustrated by curve 1 in Figure 5 wherein the relationship between changes in speed and pressure are indicated. As also previously mentioned, some designers use a number of governors for different speed ranges to more closely approximate the linear output pressure, this being illustrated by curve 2 in Figure 5 wherein two separate governors are used. Curve 3 illustrates a governor having an output pressure that varies as a linear function of the speed of rotation of the governor according to the teaching of this invention.

The output pressure of a centrifugal hydraulic governor is directly proportional to the square of the speed and linearly proportional to the radius from the axis about which the mass of the governor rotates to the centroid of the governor. For a constant mass, the relationship between pressure (P), speed ($w$) and radius (R) becomes (1) $$P = Kw^2R$$

where K is a proportionality constant.

If, in the above expression, the radius R is made a variable changing as a function of the change in speed $w$, then the relationship between the pressure and speed will be changed. From this it will be seen that by changing the location of the governor with respect to the axis of rotation as the speed changes, any desired pressure output of a centrifugal governor can be obtained. Since it is desired to have a pressure output P that is linearly proportional to speed $w$, i.e., (2) $$P = K_1 w$$

the relationship between the radius R and speed $w$ must be such that the radius is inversely proportional to speed, or (3) $$R = \frac{K_1}{Kw}$$

where K and $K_1$ are proportionality constants.

If this relationship is maintained at any speed $w$, then the output of the centrifugal governor will be linear. In terms of actual plotted points, the relationship that must be satisfied is (4) $$\frac{R_1}{R_2} = \frac{w_2}{w_1}$$

If outputs other than linear are desired, then Formula 3 would have to be changed appropriately.

This invention satisfies the above requirements by providing a governor construction wherein the pressure regulating elements per se develop an output pressure varying as the square of the speed, but the governor as a whole is in effect simultaneously moved radially with respect to the axis of rotation thereof to change the radius of rotation with a change in speed, thereby changing the centrifugal force acting thereon and resolving the output pressure into a pressure that varies as a linear function of the change of speed of rotation.

Referring now to the drawings and more particularly to Figures 1 and 2, the governor 10 comprises a two piece connected annular valve body 12 fixed at one end to a shaft 13 rotatable about an axis 14. Valve body 12 is internally bored at 16 for slidably receiving therein a slider or piston 18 radially movable with respect to axis 14. Piston 18 consists of a tubular member 20, U-shaped in cross-section, having its open end closed by a plug 22 secured thereto by suitable means (not shown). A variable rate conical shaped spring 24, suitably positioned between a boss on the plug 22 and that portion 26 of the valve body adjacent the axis 14, normally biases the piston 18 into engagement with a number of circumferentially spaced spacing pins 19 secured in the valve body as seen in Figure 1. Pins 19 are tapered at their ends to provide a point contact with piston 18 for a purpose to be described. The valve body 12 is bored at 28 to provide a fluid inlet connecting with an elongated grooved passage or bore 30 in communication at all times with an annular fluid inlet 32 in the piston 18 leading to the interior of the tube. The valve body 12 is also bored at 34 to provide a fluid outlet or exhaust connecting with an elongated bore 36 and an outlet 38 and bore 40 in the piston 18. Outlet 34 may be connected by suitable means to a sump (not shown). The confines of the tube 20 and plug 22 of piston 18 define a chamber 42 housing a radially reciprocating pressure regulating valve 44 having lands 46 and 48 connected by a neck portion 50 of reduced diameter. The area between the neck portion 50 and the walls of the tube 20 defines a pressure regulating chamber 52 connecting the fluid therein through a bored passageway 54 in the valve with the face 56 of land 48 for a purpose to be described. The piston 18 is likewise bored at 58 for communicating any fluid in chamber 52 to a chamber 60 defined by the right ends of the piston 18 and the valve body. Chamber 52 also is in communication at all times with a fluid pressure output port or outlet 57 in the piston 18 and a bore 59 in the valve body as seen in Figures 1 and 2 to connect the output pressure of the governor to the mechanism to be actuated thereby (not shown). Lands 46 and 48 of the valve are spaced apart a distance such that at no time will the inlet 32 be connected to the outlet 38. Bore 40 is elongated as shown to drain any fluid in the left side of chamber 42 between the piston and valve to outlet 34 to prevent a build-up of pressure therein.

The inlet 28 is adapted to contain a fluid of constant or varying pressure, and while no source of said pressure is shown, it is obvious that any conventional constant or variable speed fluid pump could be used.

In the operation of the governor illustrated in Figure 1, the valve 44 is initially positioned as shown blocking both the inlet 32 and outlet 40 with respect to chamber 52. Assuming a constant rotation of the valve body 12 about the axis 14 of the shaft 13 in the direction of the arrow 62, the rotation of piston 18 and valve 44 will impart a centrifugal force thereto to cause the valve to move to the right as shown in Figure 1 to uncover fluid pressure inlet 32. The fluid under pressure immediately fills chamber 52 and through passages 54 and 58 acts on the right ends of valve 44 and piston 18. Since fluid pressure acts on opposite sides of the end of piston 18 as well as on the end of valve 44, the net effect of the fluid pressure on the differential areas is to cause forces to act on both face 56 of land 48 of valve 44 and the face of piston 18 abutted by the pins 19 to urge them both to the left. Taking the action of the valve per se, as soon as the rise in pressure is sufficient to overcome the centrifugal force acting on the valve, the valve would move to the left to cut off inlet 32 and open chamber 52 to exhaust through outlet 38. The pressure therefore would decrease by exhausting the fluid through outlet 38 until the centrifugal force again is sufficient to move the valve to the right to close outlet 38 and open inlet 32. This reciprocating action of the valve would continue until an equilibrium point is reached wherein the fluid pressure balances centrifugal force acting on the valve. At this point, as in previous known conventional governors, the pressure in chamber 52 and outlet 59 would vary as a function of the square of the speed of rotation of the governor.

However, since fluid pressure is also acting simultaneously in chamber 60 against the end of the piston on the differential area between the piston inside and outside diameters, the piston will also move radially inwardly towards the axis of the governor against the centrifugal force acting thereon and the force of spring 24. The piston and valve 44 will therefore move as a unit a distance depending upon the spring rate of variable spring 24 to decrease the radius of rotation of both the piston and valve. The decreases in radius of the centers of gravity of the piston and valve from the axis of rotation thus decreases the centrifugal force acting on the piston and valve effecting therefore an ultimate decrease in the pressure in chamber 52 by the pressure regulating action of the valve. This progressive decrease in centrifugal force and fluid pressure acting on the valve causes the valve to seek a new equilibrium position at a lower pressure thereby simultaneously lowering the pressure acting in chamber 60 against the piston 18. Valve 44 therefore is regulated in its movement not only by the forces acting on it per se but also is regulated in accordance with the movement of the piston as determined by the spring rate and pressure. The valve and piston therefore have a combined movement concurrently and progressively seeking new equilibrium positions with a resultant compounded movement of the valve 44 causing a pressure to be developed in chamber 52 and bore 59 varying as a linear function of the speed of rotation of the governor to satisfy the requirements previously discussed. Upon a change in speed of rotation, new equilibrium positions of the valve and piston will be obtained, with valve 44 performing its pressure regulating function in accordance with the change in radial position of the piston 18.

It is to be noted that the effect of centrifugal force on the rotating fluid in chamber 60 and elsewhere as well as the spring mass is negligible and can be compensated for in the design of the variable rate spring 24.

Figure 3 shows a modification of the construction of Figure 1. The Figure 3 construction is capable of producing a linear pressure-speed relationship under isothermal conditions, and operates identically with the Figure 1 construction with the exception that instead of a mechanical spring 24 (Fig. 1) of variable rate, an air spring 64 is utilized wherein the temperature of the air within the bag is constant to maintain the proper spring rate. The characteristics of an air spring under isothermal conditions are that the force is inversely proportional to the length of the spring, or $$(5) \qquad F = \frac{K}{l}$$

Considering 1 as essentially the radius R from the axis 14 at which the centroid of the movable part of the governor rotates, then for two individual equilibrium points $$(6) \qquad \frac{F_1}{F_2} = \frac{l_2}{l_1} = \frac{R_2}{R_1}$$

Since the force F is essentially equal to the square of the speed of rotation and linearly proportional to the radius as previously, for any two points we get.

$$(7) \qquad \frac{F_1}{F_2} = \frac{w_1^2 R_1}{w_2 R_2}$$

Substituting these values for $$\frac{F_1}{F_2}$$

we get $$(8) \qquad \frac{R_1}{R_2} = \frac{w_2}{w_1}$$

which is identical with Formula 4.

For purposes of construction, the air bag 64 occupies the same space as spring 24 in Fig. 1 and is confined within the valve body 12 between the end adjacent the axis 14 and an actuating stem 69 formed integrally with plug 66 secured by suitable means (not shown) to tube 20 of piston 18.

Figure 4 shows still another modification of a governor embodying this invention. In this figure, the construction of the piston 18 and pressure regulating valve 44 remain the same, with the valve body 12 being extended as shown for a purpose to be presently described. The variable rate spring 24 of Fig. 1 is replaced by a linear rate compression spring 68 seated between the plug 70 closing one end of the piston 18 and a snap-ring 72 fixed to the valve body. Secured to the plug 70 is a bracket 74 having an eyelet to which is fastened a rope or similar force transmitting device 76 secured to a centrifugally responsive weight 78 by suitable means 80. Rope 76 is trained around a number of suitable pulleys 82 mounted in the extension of the valve body for reversing the direction of application of force applied to piston 18 from weight 78; the rope being wrapped around the cam-shaped face 84 of the weight. The weight 78 is pivotally connected to the valve body for movement in a substantially radial direction toward and away from the axis 14 of the shaft 13 by an off-center pivot 86. The center of gravity of the weight is located at 88 so as to make the weight movable in response to centrifugal force thereon, and weight 78 is shaped at portions 90 and 92 as shown with flat surfaces for coöperation with the valve body to limit the degree of pivotal movement of the weight and therefore the movement of the piston 18.

In this modification, the valve 44 and piston 18 are operated upon by centrifugal force and fluid pressure in the same manner as in Figs. 1–3. However, in Fig. 4, to produce the same result obtained in Figs. 1–2, i.e., an output pressure varying as a linear function of the change in speed of rotation, the force of the linear rate spring 68 combined with the opposing force exerted on the piston by the cam-shaped weight 78 must produce the same effect as the variable rate spring 24 of Fig. 1. This is accomplished as follows. The torque exerted on the rope 76 is dependent upon the mass, the centrifugal force on the weight, the speed of rotation, and the length of the torque arm, which is the perpendicular distance between the pivot 86 and the rope 76 at the edge of the cam. As the cam weight is rotated outwardly by the increasing centrifugal force acting thereon, the torque arm will decrease because of the shape of the cam face. Therefore, with the particular cam shape shown, the greater the speed of rotation and thus the greater the centrifugal force acting on the weight to rotate it radially outwardly to decrease the torque arm, the lesser the force is that is pulling on the piston 18 in opposition to the force of spring 68. This acts therefore to variably change the force exerted by the spring 68 on the piston 18 in relation to the opposed fluid pressure force in chamber 60. As stated, the cam-shape is such as to produce a linear output pressure in relation to speed changes corresponding to the Figs. 1–2 constructions. However, the shape of the cam can be chosen to produce any desired output pressure as a function of the speed since a change in the shape makes the torque arm a variable dependent upon the shape. This therefore varies the net effect of the force of spring 68 in accordance with the shape.

In operation, rotation of the valve body will move valve 44 as previously described in connection with Figs. 1–2 to seek a fluid regulating position balancing the effect of centrifugal force against the fluid pressure to develop a pressure in chamber 52 and bore 59 that varies as the square of the speed of rotation and linearly with the radius. Simultaneously therewith, the rotating weight 78 will be acted upon by centrifugal force to move the same outwardly to exert a variable torque on the rope 76 pulling the piston 18 towards the left side of Fig. 4 in opposition to the force of spring 68. Also at this time, fluid pressure in chamber 60 will force piston 18 to the left in opposition to the net effect of the spring force as previously described. The net resultant movement of the piston decreases the radius of rotation of the centroids of both piston 18 and and valve 44, and therefore varies the pressure in chamber 52 and bore 59 as a linear function of the change in speed of rotation of the governor in the same manner as previously described. A similar effect will exist upon a decrease in the speed of rotation, with the piston being moved to the right by the force of the variably controlled spring 68, the pressure in chamber 60 at this time decreasing.

From the foregoing it will be seen that this invention provides a hydraulic centrifugal governor developing an output pressure varying as a linear function of the change in speed of rotation of the governor. It will also be clear that because of the controlling variables employed, i.e., the mechanical variable rate spring in Figure 1, the isothermal elastic bag or air spring in Figure 3, and the cam-shaped weight and linear rate spring in Figure 4, changes in these variables can be made to develop hydraulic output pressures varying as any desired function thereof.

While the invention has been shown in its preferred forms in the drawings in connection with a hydraulic governor mechanism, it will be obvious to those skilled in the arts to which this invention pertains that many modifications may be made therefrom without departing from the scope of the invention.

I claim:

1. A hydraulic governor comprising a valve housing rotatable about an axis remote from one end thereof and having a hollow valve body therein, said body being slidably mounted for movement in said housing in a radial direction with respect to said axis, said body having a fluid inlet, an exhaust and an outlet therein radially spaced from each other, said inlet containing a fluid under varying pressure, and valve means slidably movable within said valve body in a radial direction for controlling communication of fluid between said inlet and said exhaust to control the pressure of the fluid in said outlet, said valve means having portions thereof together with portions of said valve body defining a fluid pressure regulating chamber in communication with said outlet; said valve means in one position connecting said chamber and said inlet while blocking said exhaust and in another position connecting said exhaust and said chamber while blocking said inlet, means connecting the fluid in said chamber to one end of said valve means for moving said valve means in one radial direction in response to the force of the fluid pressure thereon, means acting on one end of said valve body for moving said body in the same radial direction, said valve means and valve body being movable in the opposite radial direction in response to centrifugal force acting thereon upon rotation of said valve body, variable rate means biasing said valve body in one of said directions, rotation of said valve body effecting movement of said valve body and said valve means alternately to said positions for regulating the fluid pressure in said chamber and said outlet as a linear function of the change in speed of rotation of said valve body.

2. A hydraulic governor comprising a hollow valve housing and a valve body therein together rotatable about an axis remote from one end of said valve body, said body being slidably mounted with respect to said housing for movement in a radial direction, said body having a hollow chamber therein, said body having a fluid inlet and outlet spaced from each other and communicating with said chamber, said inlet containing a fluid under varying pressure, and a fluid pressure regulating valve slidably movable in a radial direction within said body for regulating the fluid pressure in said outlet, means connecting the fluid in said inlet and one end of said valve for moving said valve in one direction in response to the force of the fluid pressure thereon, means acting on one end of said valve body for moving said body in the same direction, said valve and valve body being movable in the opposite direction in response to centrifugal force acting thereon upon rotation of said valve body, variable rate means biasing said valve body in one of said directions, rotation of said valve body effecting movement of said valve body and pressure regulating valve to equilibrium positions balancing the oppositely acting forces to vary the pressure of the fluid in said outlet as a linear function of the change in speed of rotation of said valve body.

3. A centrifugal hydraulic governor developing a pressure varying as a linear function of the change in speed of rotation of said governor comprising a hollow valve body rotatable about an axis at one end, a radially slidable hollow piston mounted within said valve body, said valve body and piston having connnected fluid inlets and connected fluid exhausts and connected fluid outlets, and a reciprocating valve slidably mounted within said piston for controlling the communication of fluid between said inlets and said exhausts to control the pressure of said fluid in said outlets, said valve having portions together with portions of said piston defining a fluid chamber in communication with said outlets, said valve being movable to a first position connecting said chamber and said inlets while blocking said exhausts and movable to a second position connecting said exhausts and said chamber while blocking said inlets, means connecting said chamber and one end of said valve for moving said valve in one direction in response to the force of fluid pressure acting thereon, said valve and piston being movable in the opposite direction in response to centrifugal force acting thereon upon rotation of said valve body, force means biasing said piston in one of said directions, and other force means acting on one end of said piston moving said piston in said one direction, said inlets containing a fluid under variable pressure, rotation of said valve body effecting movement of said piston and said valve to equilibrium positions balancing the effect of said oppositely acting forces to provide a regulating action of the valve between said first and second positions varying the pressure of the fluid in said chamber and said outlets as a linear function of the change in speed of rotation of said valve body.

4. A hydraulic governor as in claim 3, wherein said biasing force means comprises variable rate spring means between said piston and the end of said valve body adjacent said axis, fluid passage means in said one end of said piston connnecting the fluid acting on the one end of the valve to said one end of the piston to comprise said other force means, movement of said piston by said fluid pressure force means against the action of said spring means decreasing the radius of rotation of said piston thereby decreasing the centrifugal force acting on said piston and said valve upon a change in speed of rotation of said valve body.

5. A hydraulic governor as in claim 3, wherein said biasing force means comprises yieldable elastic means between said piston and a portion of said valve body adjacent said axis, fluid passage means in said one end of said piston connecting the fluid acting on the one end of the valve to said one end of the piston to comprise said other force means, movement of said piston by said other force means against the action of said yieldable elastic means decreasing the radius of rotation of said piston thereby decreasing the centrifugal force acting on said piston and said valve upon a change in speed of rotation of said valve body.

6. A hydraulic governor as in claim 3, wherein said biasing force means includes spring means and a weight member, said latter member being pivoted off-center at one portion to said valve body for a radial-like movement, and connecting means between said weight member and said piston, a change in the speed of rotation of said valve body subjecting said weight to the change in the effect of centrifugal force thereon effecting a radial movement of said piston and valve thereby changing the centrifugal force thereon.

7. A hydraulic governor mechanism comprising a hollow valve housing and a hollow valve body therein together rotatable about an axis remote from one end of said body, said body being slidably mounted for movement in a radial direction in said housing with respect to said axis, said body having a fluid inlet, exhaust and outlet therein radially spaced from each other, and slidable valve means within said valve body for controlling the communication of fluid between said inlet and exhaust to control the pressure of the fluid in said outlet, said valve means having portions together with said valve body defining a fluid pressure regulating chamber communicating with said outlet, said valve being radially movable between positions connecting said chamber and said inlet while blocking said exhaust and connecting said chamber and said exhaust while blocking said inlet for regulating the pressure in said chamber and outlet, means connecting the fluid in said chamber to one end of said valve means for moving said valve means in one radial direction in response to fluid pressure applied thereto, said valve means and valve body being moveable in the opposite direction in response to centrifugal force thereon upon rotation of said housing, and means biasing said valve body in the opposite radial direction, said means comprising centrifugally responsive weight means movable substantially radially in response to centrifugal force acting thereon upon a change in the speed of rotation of said valve body, and connecting means between said weight means and said valve body.

8. A hydraulic governor mechanism developing a pressure varying as a linear function of the speed of rotation of said mechanism comprising a hollow valve body rotatable about an axis at one end, a hollow slidable piston within said body movable in a radial direction with respect to said axis, said body and piston having fluid inlets and exhausts connected to each other respectively at all times, and a valve slidably mounted within said piston for controlling the communication of fluid between said inlets and exhausts, said valve in one position closing said inlets and opening said exhausts and vice versa in another position, said valve being movable to a plurality of positions between said two positions for controlling the communication of fluid therebetween, said inlets containing a fluid under pressure, passage means in said valve containing fluid under pressure and connecting one end of said valve and another portion, said valve body and piston having fluid outlets therein in communication with said portion, means moving said piston in a radial direction to change the radius of rotation of said piston and valve, rotation of said valve body effecting movement of said valve to a fluid pressure regulating position under the combined influence of centrifugal force and the fluid pressure acting on one end thereof, the combined movements of said valve and piston under the influence of centrifugal force, fluid pressure and the piston moving means developing a pressure in said valve portion and outlets varying as a linear function of the speed of rotation of said valve body.

9. A hydraulic governor mechanism developing a fluid pressure varying as a linear function of the change in speed of rotation of the mechanism comprising a hollow valve body rotatable about an axis at one end, a radially slidable hollow piston mounted within said body, and a radially slidable valve within said piston, means containing a fluid under pressure, said body and piston having fluid inlets connected to each other and to said means, fluid passage means connecting the fluid in said inlets to one end of said valve for moving said valve in one radial direction, and means acting on one end of said piston for moving said piston and valve concurrently in the same radial direction, said piston and valve body having fluid exhausts connected together and fluid outlets connected together and in communication with said passage means, said valve and piston being movable in the opposite radial direction in response to centrifugal force acting thereon upon rotation of said valve body, variable rate means biasing said piston in one of said radial directions, said valve being movable to positions alternately opening and closing said inlets and exhausts for regulating the fluid pressure in said passage means and outlets as a linear function of the change in speed of rotation of said valve body upon rotation of the same and a radial movement of said piston.

10. A hydraulic governor comprising a hollow valve housing and a valve body therein together rotatable about an axis remote from one end of said body, said body having a hollow chamber therein, said valve body being slidably mounted for movement in said housing in a radial direction with respect to said axis, and a valve slidably mounted within said chamber for movement also in a radial direction with respect to said axis, said body having a fluid inlet, an exhaust and an outlet each communicating with said chamber and spaced radially from one another, said inlet containing a fluid under varying pressure, means connecting the fluid in said inlet and one end of said valve for moving said valve in one direction, means for moving said valve body in the same direction, said valve and valve body being movable in the opposite direction in response to centrifugal force acting thereon upon rotation of said valve body, variable rate means biasing said valve body in one of said directions, said valve being slidable to a plurality of positions alternately opening said inlet and closing said exhaust and vice versa respectively for regulating the fluid pressure in said connecting means in response to the movement of said valve and valve body by the resultant effect of centrifugal force, the valve body moving means, and fluid pressure acting on the valve to vary the fluid pressure as a linear function of the change in speed of rotation of said valve body.

11. A hydraulic governor mechanism developing a pressure varying as a linear function of the speed of rotation thereof comprising, a hollow valve body rotatable about an axis at one end, hollow piston means slidably mounted within said body, and slidable valve means mounted within said piston means, said valve body and said piston means each having a fluid inlet and outlet, the inlet of said valve body containing a source of fluid under pressure, passage means connecting said inlet to one end of said valve means moving said valve means in one direction, means for moving said piston means in the same direction, rotation of said valve body imparting a centrifugal force to both of said piston and valve means radially moving said piston and valve means in the opposite direction, variable rate means biasing said piston means in one of said directions, rotation of said valve body developing a pressure in said passage means varying as a linear function of the change in speed of rotation upon movement of both of said means in a radial direction.

12. A hydraulic governor comprising a rotatable valve housing having a valve body slideably mounted therewithin and a valve slideably mounted within said valve body, a source of fluid under pressure, means connecting said source and one end of said valve and valve body respectively for moving said valve and valve body individually and concurrently in one direction in response to the force of fluid pressure thereon, a fluid outlet, means connecting the fluid at one end of said valve and valve body to said outlet, and variable rate force means opposing the movement of said valve body by said fluid pressure force, rotation of said housing creating a centrifugal force on said valve and valve body urging said valve and valve body in an opposite direction, the rotation of said housing developing the fluid pressure in said outlet and said fluid pressure force acting against said valve and valve body to vary as a linear function of the change in speed of rotation of said housing.

References Cited in the file of this patent

UNITED STATES PATENTS

| | | |
|---|---|---|
| 2,711,749 | Hettinger | June 28, 1955 |
| 2,738,650 | McAfee | Mar. 20, 1956 |
| 2,858,839 | Jackson | Nov. 4, 1958 |